United States Patent
Ikuta et al.

(10) Patent No.: US 6,651,039 B1
(45) Date of Patent: Nov. 18, 2003

(54) MECHANICAL TRANSLATION APPARATUS AND METHOD

(75) Inventors: Junzo Ikuta, Fukuoka (JP); Masako Yoshimura, Dazaifu (JP); Kuniko Akiyama, Fukuoka-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/687,195

(22) Filed: Jul. 25, 1996

(30) Foreign Application Priority Data

Aug. 8, 1995 (JP) .............................. 7-233156

(51) Int. Cl.$^7$ ............................................. G06F 17/28
(52) U.S. Cl. ...................... 704/4; 704/2; 704/5; 704/8; 704/3
(58) Field of Search ....................... 704/1–10

(56) References Cited

U.S. PATENT DOCUMENTS

| | | | |
|---|---|---|---|
| 4,866,670 A | * 9/1989 | Adachi et al. | 704/5 |
| 4,894,779 A | * 1/1990 | Suzuki et al. | 704/2 |
| 5,689,724 A | * 11/1997 | Morgan et al. | 395/805 |
| 5,729,618 A | * 3/1998 | Fujisawa | 382/100 |

FOREIGN PATENT DOCUMENTS

| | | |
|---|---|---|
| JP | 62163174 | 7/1987 |
| JP | 62163177 | 7/1987 |
| JP | 04296969 | 10/1992 |
| JP | 05035785 | 2/1993 |
| JP | 05108711 | 4/1993 |

OTHER PUBLICATIONS

Japanese Office Action 1 dated Aug. 4, 1998 with English translation

Japanese Office Action 2 dated Nov. 24, 1998 with English translation

* cited by examiner

*Primary Examiner*—Vijay Chawan
(74) *Attorney, Agent, or Firm*—Stevens, Davis, Miller & Mosher, LLP

(57) ABSTRACT

A mechanical translation method includes a first step of dividing an input original sentence into a plurality of word trains in accordance with a predetermined division rule, a second step of converting the original sentence into a translated sentence for each divided word train, and a third step of displaying a pair of the original sentence and the translated sentence. In the first step, a predetermined symbol is inserted at partition positions of the divided original and translated sentences. In the third step, each word train of the divided original sentence and its corresponding translated sentence are displayed in a juxtaposed style. In the first step, the division operation is performed in accordance with a rule selected from a plurality of division rules. Also in the first step, the inserted symbol is different for each division rule.

21 Claims, 7 Drawing Sheets

I must thank the boy who found my wallet.

↓

I / must thank / the boy who found my wallet.
私／感謝しなければならない／私の財布を見つけた少年

FIG.7
```
The boy who found my wallet is a high school student.
```
```
The boy who found my wallet / is / a high school student.
私の財布を見つけた少年／です／高校生
```
```
The boy / who found / my wallet / is / a high school student.
少年／その人は見つけた／私の財布／です／高校生
```
FIG.10
```
I must thank / the boy / who found / my wallet.
私は感謝する／少年　／その人は見つけた／私の財布
```

FIG.8

| I must thank / the boy / who found / my wallet. |

↓

| I must thank the boy / who found my wallet.<br>私は少年に感謝する／その人は私の財布を見つけた |

↓

| I must thank / the boy / who found / my wallet.<br>私は感謝する／少年／その人は見つけた／私の財布 |

↓

| I / must thank / the boy / who found / my wallet.<br>私／感謝する／少年／その人は見つけた／私の財布 |

MECHANICAL TRANSLATION APPARATUS AND METHOD

BACKGROUND OF THE INVENTION

Field of the Invention

The present invention relates to a mechanical translation apparatus and method for translating one original language into another language.

In conventional translation, users or professional translators use a mechanical or machine translation apparatus to mostly translate a foreign language into a language of its own country. However, general users, not only professional translators; have recently had many chances of translations because of recent circulation of personal computers and communication apparatus and development of the Internet.

In many cases, general users desire to understand the meanings of foreign language information which they read from time to time, and they necessarily happen to use a machine translation apparatus.

However, with the current level of language processing techniques of a machine translation apparatus, it is impossible to perfectly translate all sentences and many machine translation apparatus output sentences containing errors. If a translated language contains errors, a user is forced to read again the original language. Long time and much labor are required for a user to read an original language after reading the translated language, particularly between an original English language and a translated Japanese language whose word order are very different.

For example, a conventional translation apparatus translates an English sentence:

"The newest information on device drivers and how to get installation manual from the author are explained in this section." into a Japanese sentence:

"著者からインストレーションマニュアルを得ることは、

このセクションで説明されたデバイスドライバーと、やり方

に関する最も新しい情報".

In this example, since the original sentence is not correctly translated, it is difficult for a user to understand the meanings of the translated sentence. In this case, since the word orders of the original and translated sentences are different, it takes time and labor to compare both the sentences and the user is forced to read again the original sentence to the end.

SUMMARY OF THE INVENTION

It is an object of the present invention to provide a mechanical translation apparatus and method capable of quickly outputting a translation excellent in readability.

A mechanical translation method of this invention comprises: a first step of dividing an input original sentence into a plurality of word trains in accordance with a predetermined division rule; a second step of converting the original sentence into a translated sentence for each divided word train; and a third step of displaying the original sentence and the translated sentence in one-to-one word train correspondence.

A mechanical translation apparatus of this invention comprises: input means for inputting an original sentence and entering various instructions; storage means for storing the original sentence input from the input means; division means for dividing the original sentence in accordance with a predetermined division rule; translation means for converting the original sentence into a translated sentence in the division unit; correspondence sentence generating means for generating a corresponding pair of the original sentence and the translated sentence and storing the two sentences in the storage means; and display means for displaying the original sentence and the translated sentence in one-to-one word train correspondence.

In this invention, a phrase division unit divides an original sentence in a translation unit of phrase, and the original sentence and a translated sentence are displayed as a pair on a display device after partition symbols are inserted into the two sentences so as to make easy to understand a correspondence between the two sentences.

BRIEF DESCRIPTION OF THE DRAWINGS

FIG. 7 shows a change in display screen in the mechanical translation apparatus and method of the embodiment.

FIG. 8 shows a change in display screen in the mechanical translation apparatus and method of the embodiment.

FIG. 10 shows an example of a display screen in the mechanical translation apparatus and method of the embodiment.

DETAILED DESCRIPTION OF THE PREFERRED EMBODIMENTS

An embodiment of the invention will be described with reference to the accompanying drawings.

Figure 1:
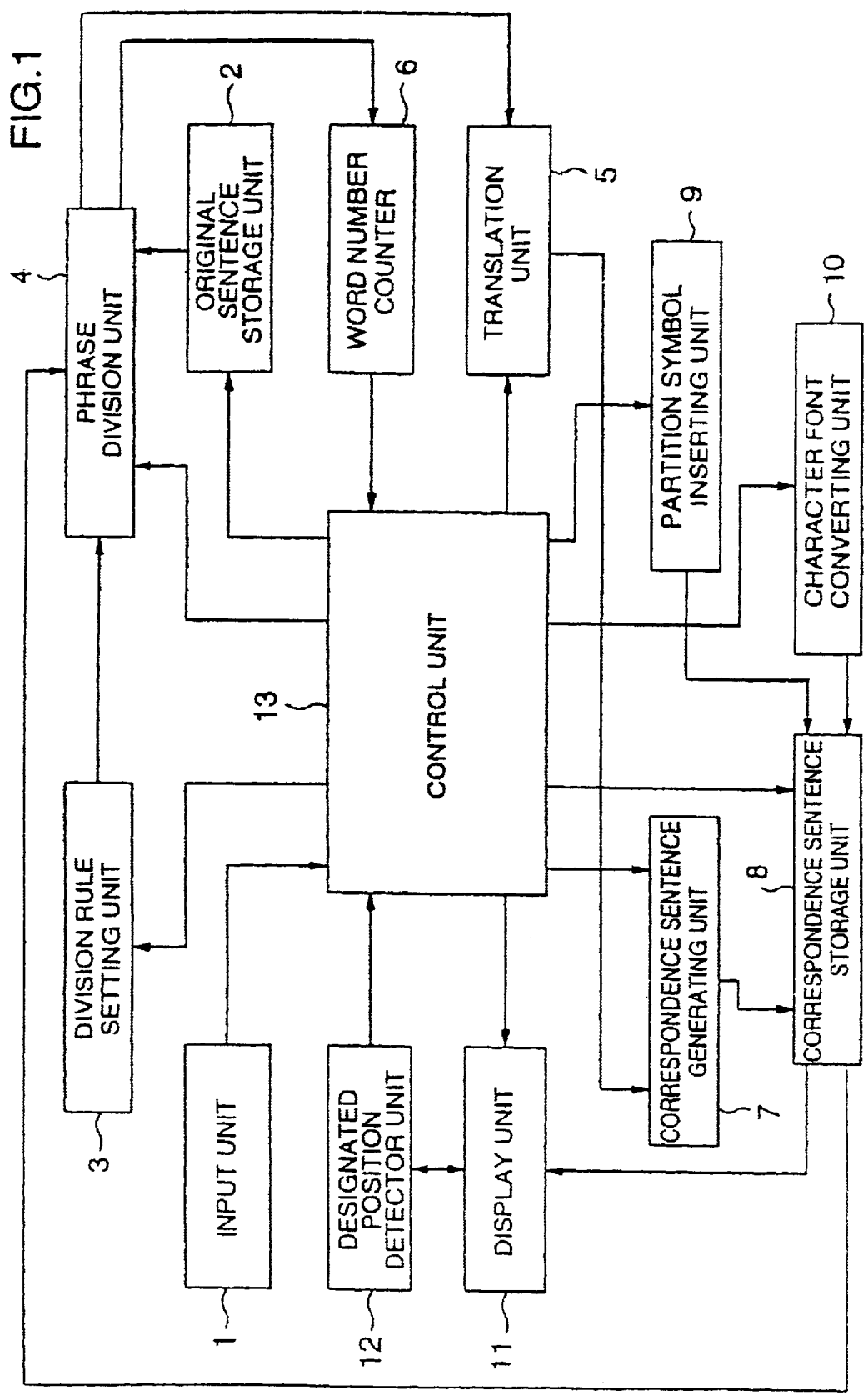
FIG. 1 is a functional block diagram illustrating a mechanical translation apparatus and method according to an embodiment of the present invention.

FIG. 1 is a functional block diagram of a mechanical translation apparatus according to an embodiment of the invention, to be used for explaining the mechanical translation apparatus and method.

In FIG. 1, reference numeral 1 represents an input unit for inputting an original sentence and entering various instructions, reference numeral 2 represents an original sentence storage unit for storing an original sentence or text input from the input unit 1, reference numeral 3 represents a division rule setting unit for setting a division rule of an original sentence upon reception of an instruction from the input unit 1, and reference numeral 4 represents a phrase division unit for dividing an original sentence or text stored in the original sentence storage unit 2, in accordance with the division rule set by the division rule setting unit 3 and syntax information supplied from a built-in syntax analyzing unit (not shown).

Reference numeral 5 represents a translation unit for translating each division unit of an original sentence divided by the phrase division unit, in accordance with a built-in word dictionary, reference numeral 6 represents a word number counter unit for counting the number of words contained in each division unit, reference numeral 7 represents a correspondence sentence generating unit for providing a correspondence between a divided original sentence and a divided translated sentence, and reference numeral 8 represents a correspondence sentence storage unit for storing a correspondence sentence generated by the correspondence sentence generating unit 7, the sentence having partition symbols inserted at partition positions by a partition symbol inserting unit 9 and having character fonts changed by a character font converting unit 10.

Reference numeral 11 represents a display unit for displaying correspondence sentences stored in the correspondence sentence storage unit 8, and reference numeral 12 represents a designated position detector unit for detecting a position on a display screen of the display unit 11, designated by the input unit 1 with a cursor or the like. Reference numeral 13 represents a control unit for controlling the operation of each unit.

The division rule setting unit 3 can set the following four types of division rules.

Rule (A): "dividing into a subject, a verb, and an object".
Rule (B): "dividing into a clause".
Rule (C): "dividing into a noun phrase and a verb phrase".
Rule (D): "dividing freely as a user designates".

Figure 2:
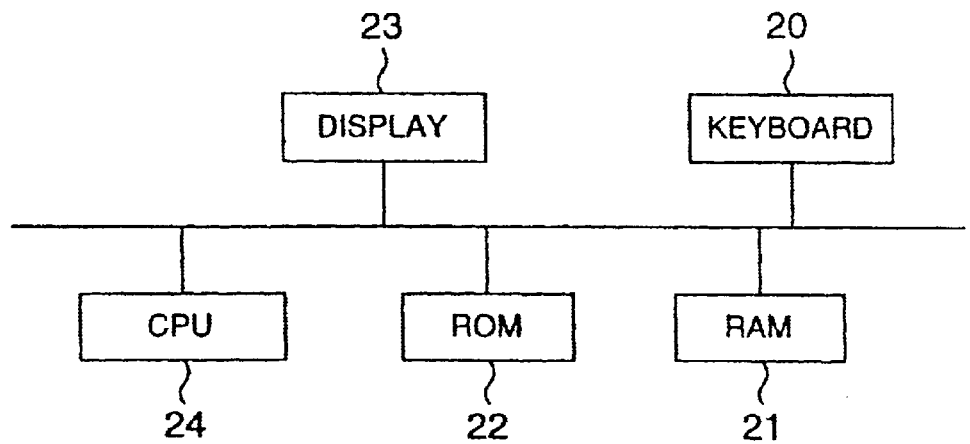
FIG. 2 is a circuit block diagram showing the structure of the mechanical translation apparatus and method of the embodiment.

FIG. 2 is a block diagram showing the circuit structure of the embodiment. A keyboard 20 corresponds to the input unit 1, a RAM 21 corresponds to the original sentence storage unit 2 and correspondence sentence storage unit 9, a display 23 corresponds to the display unit 11, and a CPU corresponds to the control unit 13.

A ROM 22 stores therein the division rules, the word dictionary, and control programs for each process to be executed by the division rule setting unit 3, phrase division unit 4, translation unit 5, word number counter unit 6, correspondence sentence generating unit 7, correspondence sentence storage unit 8, partition symbol inserting unit 9, character font converting unit 10, display unit 11, and designated position detector unit 12.

The outline of the operation of the embodiment constructed as above will be described with reference to the accompanying drawings.

A user first selects a suitable division rule based upon the contents, difficulty, and the like of an original sentence by using the input unit 1 and makes the division rule setting unit 3 to set it. This setting may be performed after an original sentence input process.

Figure 3:
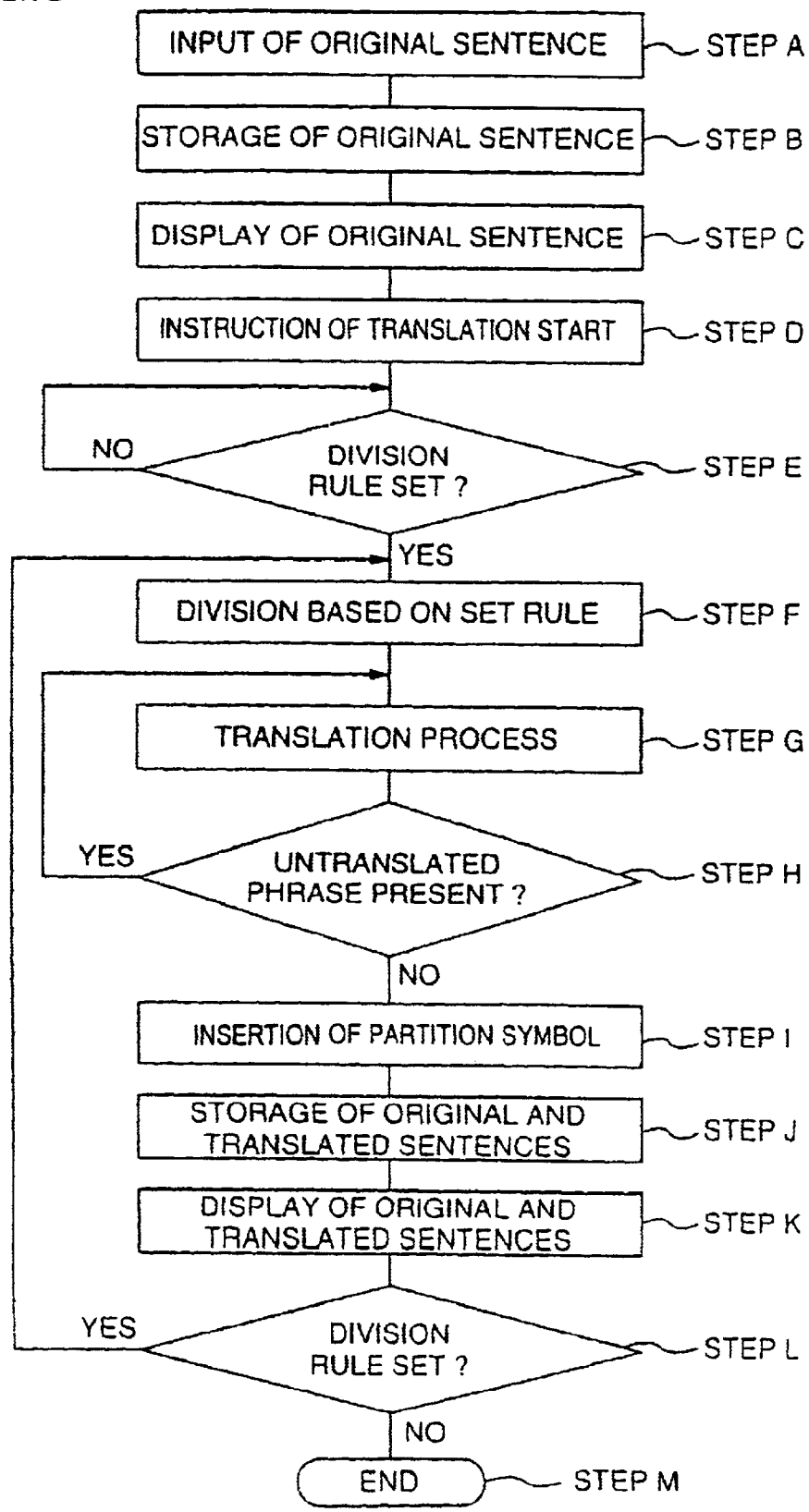
FIG. 3 is a flow chart illustrating the operation of the mechanical translation apparatus and method of the embodiment.

Reference is made to the functional block diagram of FIG. 1 and the flow chart of FIG. 3. First, at step A, an original sentence to be translated is input from the input unit 1. The input unit 1 may have a load function of information from a storage medium such as a floppy disk. At step B, the original sentence input from the input unit 1 is temporarily stored in the original sentence storage unit 2 in the text form. At step C the original sentence is displayed on the display screen of the display unit 12.

Next, at step D when a translation instruction is entered by the user from the input unit 1, the original sentence is supplied to the translation unit 6. At step E the phrase division unit 4 decides if any division rule has been set, and if not, a user setting is waited for.

Next, at step F the phrase division unit divides the original sentence in accordance with the division rule set by the division rule setting unit 3.

At step G, the translation unit 5 translates the original sentence in the division unit. At step H, the translation unit 5 checks a presence or absence of a division unit (phrase unit) still not translated, and if there is any division unit, this phrase of the original sentence is translated.

At step I, the correspondence sentence generating unit 7 generates a divided original sentence and a divided translated sentence in one-to-one division unit correspondence and stores them in the correspondence sentence storage unit 8. At step J, the partition symbol inserting unit 9 inserts partition symbols between divided positions of the original and translated sentences stored in the correspondence storage unit 8. At step K, the corresponded original sentence and translated sentence stored in the correspondence storage unit 8 are displayed.

If the user sets thereafter another division rule, the flow returns to the step F to again divide the divided original sentence in the correspondence sentence storage unit 8 and repeats the steps G, H, I, J, and K.

If a re-division instruction is not entered from the user at the step L, the final translation result is displayed to terminate the phrase division translation.

The phrase unit translation process of this embodiment will be detailed with reference to the flow chart of FIG. 3 by using a particular example.

The following original sentence is input from the input unit (step A), stored in the original storage unit 2, and displayed on the display unit (steps B and C).

As a first example, the following original sentence is assumed:

"I must thank the boy who found my wallet."

It is assumed that a user selects the Rule (A): "dividing into a subject, a verb, and an object" which is set to the rule setting unit 3.

As the user requests from the input unit 1 a translation of the original sentence stored in the original sentence storage unit 2 (step D), the phrase division unit 4 operates to execute a phrase division process (step F). With this phrase division process, the original sentence is divided into the following three phrases:

"I
must thank
the boy who found my wallet."

Figure 4:
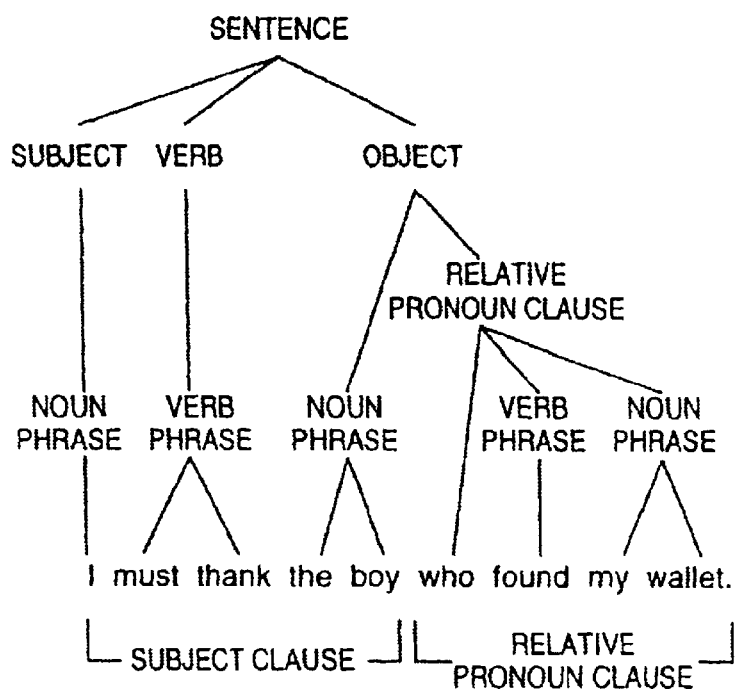
FIG. 4 is a tree structure diagram illustrating a syntax of an example of an original sentence.

FIG. 4 shows the tree structure of a sentence syntax clarifying the structure of phrases of the original sentence.

The phrase division unit 4 divides the original sentence in accordance with the Rule (A) and the translation unit 3 executes a translation process so long as there is any phrase to be translated (step E).

With the translation process for each phrase, the translation results are as follows:

| "I | →私 |
| must thank | →感謝しなければならない |
| the boy who found my wallet." | →私の財布を見つけた少年 |

After the translation process by the translation means 3 for all the phrases is completed, the correspondence sentence generating unit 7 makes the partition symbol inserting unit 9 insert partition symbols between phrases of the original sentence and generate the following translated sentence (step I):

私／感謝しなければならない／私の財布を見つけた少年

At the same time, the partition symbol inserting unit 9 inserts the partition symbols at the phrase partition positions of the original text to generate the following sentence:

"I/must thank/the boy who found my wallet."

Next, at step J, the correspondence sentence generating unit 7 stores a pair of the original sentence and translated sentence inserted with the partition symbols into the correspondence sentence storage means 8.

At step K, the original sentence and translated sentences stored in the correspondence sentence storage unit 8 are displayed on the display unit 11.

Figures 5, 6:
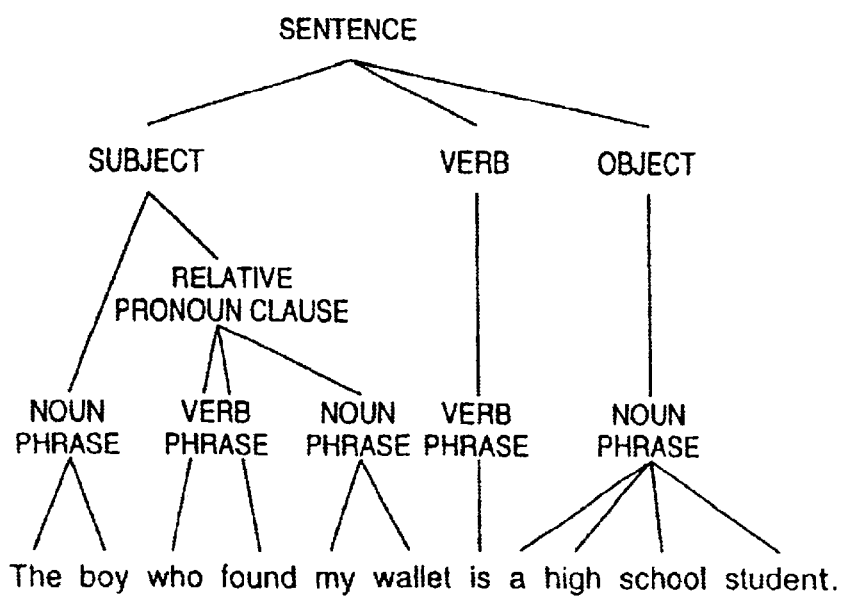
FIG. 5 shows a change in display screen in the mechanical translation apparatus and method of the embodiment.
FIG. 6 is a tree structure diagram illustrating a syntax of an example of an original sentence.

FIG. 5 shows a change in display screen before and after the translation by the embodiment processes.

As a second example, the original sentence of the first example is subjected to the phrase division by using the phrase division Rule (B): dividing into a clause. With reference to the tree structure of FIG. 4 and this division Rule (B), the original sentence is divided into two clauses, a subject clause and a relative noun clause. With the translation process, the following original sentence and translated sentence are obtained and displayed on the display unit 12:

"I must thank the boy/who found my wallet."

私は少年に感謝しなければならない／私の財布を見つけた

As a third example, a detailed division process (re-division process) by the phrase division unit 4 will be described.

First, a phrase division is set to perform a phrase division of an original sentence:

"The boy who found my wallet is a high school student.", by using the Rule (A): "dividing into a subject, a verb, and an object".

When a user requests a translation, the phrase division unit 4 operates to execute the phrase division in accordance with the Rule (A) so that the original sentence is divided into the following three phrases (refer to FIG. 6):

"The boy who found my wallet is a high school student."

Next, the translation unit 5 operates to translate each divided phrase, and the following translated sentence is generated:

"The boy who found may wallet

→私の財布を見つけた少年 is

→です a high school student.

→高校生"

Then, the partition symbol inserting unit 9 inserts partition symbols (/) into the two sentences and the following sentences are displayed on the display unit 11:

"The boy who found my wallet/is/a high school student."

私の財布を見つけた少年／です／高校生

In this case, the display unit 23 may display a corresponding pair of the original sentence and translated sentence by emphasizing every second phrase pairs in the background of characters by using crossed hatches or single direction hatches, in order to clearly show the correspondence between the juxtaposed pair of the original sentence and translated sentence.

The word number counter unit 6 counts the number of words in each phrase to detect a phrase having the number of words equal to or larger than that the user preset from the input unit 1.

Next, the detailed division process will be described wherein a user sets the Rule (C): "dividing into a noun phrase" and a verb phrase to the rule setting unit 3 and sets the number of words "6" to the word number counter unit 8. In this case, the word number counter unit 6 detects that the subject is constituted by six words including "The", "boy", "who", "found", "my", and "wallet" so that this phrase is divided in accordance with the Rule (C) by the phrase division unit 4.

This division process mode can be set at any time to divide a long original phrase into short phrases.

The original sentence is therefore divided into the following five phrases:

"The boy who found my wallet is a high school student."

With reference to the tree structure shown in FIG. 6, the subject of this original sentence is divided into smaller phrases of noun phrases and a relative noun phrase, and this relative noun phrase is further divided into verb phrases and noun phrases.

Each phrase is translated by the translation unit 5, the translation results being as follows:

"The boy

→少年 who found

→見つけた my wallet

→私の財布 is

→です a high school student.

→高校生"

Next, the partition symbol inserting unit 9 inserts partition symbols (/) at phrase partition positions of the translated sentence to form the following sentence:

少年／その人は見つけた／私の財布／です／高校生

The partition symbol inserting unit 9 also inserts partition symbols at phrase partition positions of the original sentence to form the following original sentence:

"The boy/who found/my wallet/is/a high school student."

The original sentence and translated sentence processed as above are stored as a pair in the correspondence sentence storage unit 8 and displayed to the user through the display unit 11.

A change in display screen in the detailed division process mode of this embodiment is shown in FIG. 7.

As the partition symbol, (/) may be used as the first division and (|) may be used as the second division as in the following:

"The boy |who found |my wallet/is/high school student."

少年見つけた私の財布です高校生

This difference of the partition symbols facilitates to understand that "The boy who found my wallet" was originally one long phrase. Different partition symbols may be used for each division rule. A change in display screen before and after translation is shown in FIG. 8.

As a fourth example, a continuous division process by the Rules (A), (B), and (C) will be described.

This continuous division process is automatically executed upon a user instruction of, for example, executing the first division by the Rule (A), the second division by the Rule (B), and the third division by the Rule (C). Specifically, each time the user designates the division process, the original sentence is divided in accordance with the above Rules.

A procedure of the continuous division for an original sentence "I must thank the boy who found my wallet." will be described.

First, as a user requests a translation of the original sentence, the translation unit 5 operates the phrase division unit 4 to divide the original sentence into phrases in accordance with the Rule (A), the translation unit 5 translates each phrase, and the partition symbol inserting unit 9 inserts partition symbols to display the following translation results:

"I must thank the boy/who found my wallet."

"私の少年に感謝する ／私の財布を見つけた"

When the user further requests the phrase division, the above translation results are divided in accordance with the Rule (B) to obtain the following translation results:

私は感謝する ／ 少年 ／ 見つけた ／ 私の財布

When the user further requests the phrase division, the above translation results are divided in accordance with the Rule (C) to obtain the following translation results:

"I must thank/the boy/who found/my wallet."

"私　　感謝する／ 少年 ／ 見つけた ／ 私の財布"

In the above manner, each time user instructs, the phrase is divided into shorter phrases.

FIG. 8 shows a change in display screen when the division is performed in accordance with the user instruction as above.

The correspondence sentence storage unit 7 also stores the position coordinate information of each word on the screen of the display unit 11 and the position coordinate information of corresponding partition symbols of the original sentence and translated sentence. Therefore, by referring to the partition symbols added to the original sentence and those added to the corresponding translated sentence, the upper and lower positions of the partition symbols may be displayed as in the following:

"I/must thank/the boy/who found/my wallet."

"私 ／ 感謝する／ 少年 ／ 見つけた ／ 私の財布"

In this case, the space between characters does not change, and the partition symbol of the translated sentence is aligned with that of the original sentence on the display screen.

If there is a large difference of the number of characters between the original and translated sentences and the above-aligned partition symbols cannot be displayed in a position aligned style, both the sentences are displayed by reducing the number of points of a character font of the translated sentence.

Figure 9:
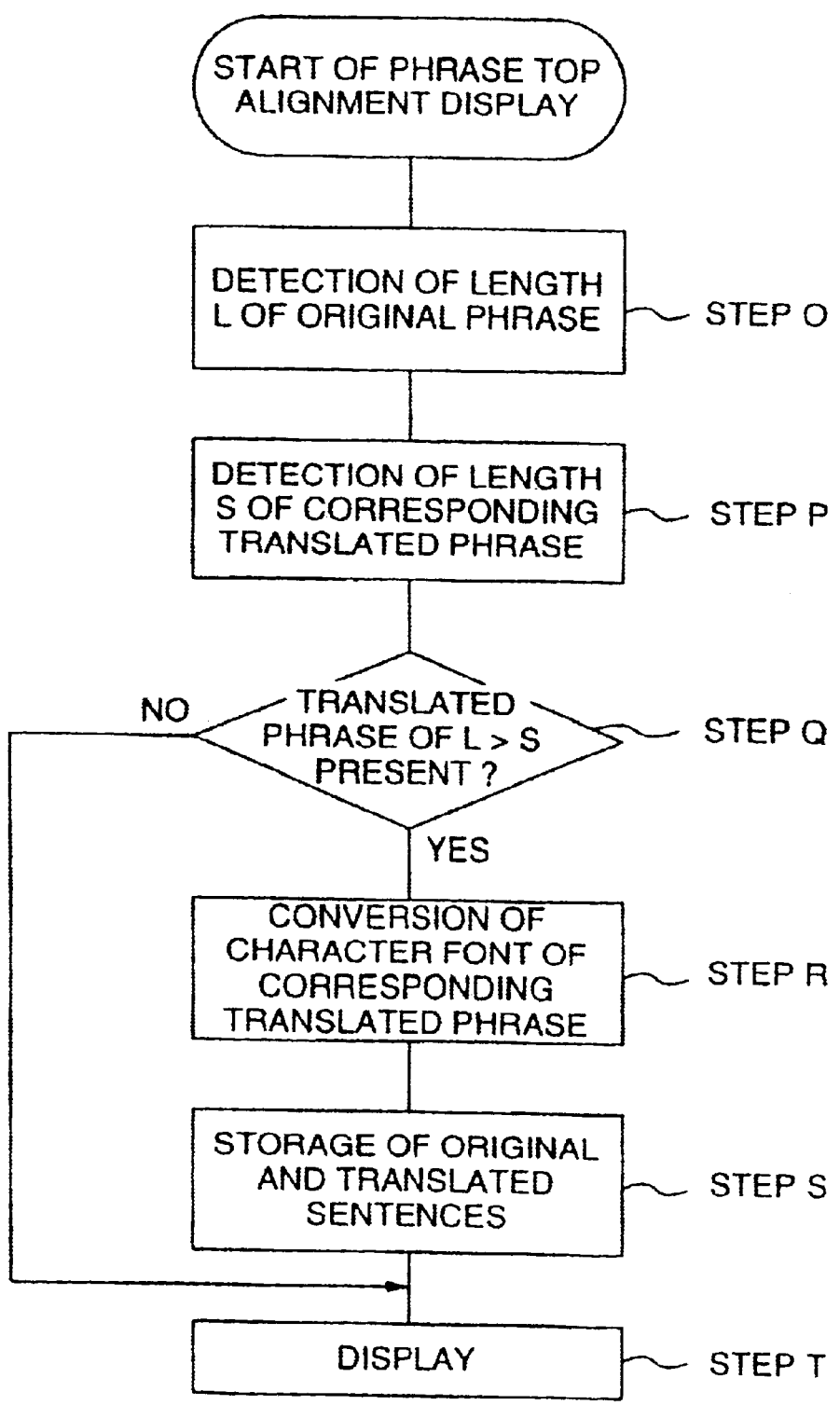
FIG. 9 is a flow chart illustrating the operation of the mechanical translation apparatus and method of the embodiment.

This font conversion process will be described with reference to the flow chart of: FIG. 9. At step O, a length L of each phrase of the original sentence is calculated, and at step P, a length S of each corresponding phrase of the translated sentence is calculated. At step Q, a pair of the phrases of the original and translated sentences having a relationship of "L>S" is detected.

At step R, of the original and translated sentences having the above relationship, the number of points of the character fonts of the translated sentence is reduced so that the length of the phrase of the translated sentence becomes equal to or shorter than L. At step S, the translated and font-reduced sentence is overwritten in the corresponding sentence storage means 8, and at step T the new translated sentence is displayed on the display unit 11 (refer to FIG. 10).

If there is no pair of the original and translated sentences having the above relationship, both the sentences are not changed and displayed as they are at step T.

If an original sentence is displayed in two rows on the display screen, each row of a translated sentence may be displayed under each row of a corresponding translated sentence as in the following, because the coordinate position information of each word is stored in the correspondence sentence storage means:

"I/must thank/the boy/who found

私 ／ 感謝する／ 少年 ／見つけた

/my wallet."

／ 私の財布

A fifth example will be described. The correspondence sentence storage unit 8 stores therein position coordinates of each word and each partition symbol on the display screen, an English word corresponding to each coordinate value, and a translated work corresponding to each English word. Therefore, a user can divide finely an original sentence still not translated or an original sentence already translated, as desired, by selecting the Rule (D) and by activating the phrase division unit 4 by designating a partition position of the original sentence displayed on the display unit with a cursor or the like of the input unit 1.

Furthermore, one of the original sentence and the translated sentence displayed on the display screen can be displayed at any time in an emphasized mode such as inversion, cross hatching, and one direction hatching, by designating the sentence with a pen or the like.

Although the invention has been described in connection with the embodiment of a mechanical translation apparatus, the invention can be reduced in practice as a translation program. Specifically, the translation program is stored in a storage medium such as a floppy disk, and the storage medium is mounted on, for example, a personal computer, loaded in the storage area of the personal computer, and run to execute the phrase division translation.

What is claimed is:

1. An automated translation method, comprising:

dividing, with a grammatical processor, an original sentence into a plurality of first grammatical components according to a first division rule executed by the grammatical processor;

dividing, with the grammatical processor, each of the first grammatical components into a plurality of second grammatical components according to a second division rule executed by the grammatical processor;

translating each of the second grammatical components into grammatical components of another language;

combining the translated grammatical components into a translated sentence; and displaying the original sentence and the translated sentence in vertical juxtaposition.

2. The automated translation method of claim 1, wherein displaying the original sentence and the translated sentence further comprises:

displaying the original sentence with a first symbol separating each of the first grammatical components;

displaying the translated sentence with the first symbol separating each of the translated grammatical components corresponding to the first grammatical components;

displaying the original sentence with a second symbol separating each of the second grammatical components; and displaying the translated sentence with the second symbol separating each of the translated grammatical components corresponding to the second grammatical components.

3. The automated translation method of claim 1, wherein the first and second division rules are each one of:

(a) dividing a sentence or sentence component into a subject component, a verb component, and an object component, (b) dividing a sentence or sentence component into a subject clause and a relative pronoun clause, and (c) dividing a sentence or sentence component into a noun phrase and a verb phrase.

4. The automated translation method of claim 1, wherein the first and second division rules are selected from a plurality of division rules by a user.

5. An automated translation method, comprising:

dividing, with a grammatical processor, an original sentence into a plurality of first grammatical components according to a first division rule executed by the grammatical processor;

dividing, with the grammatical processor, each of the first grammatical components into a plurality of second grammatical components according to a second division rule executed by the grammatical processor;

dividing, with the grammatical processor, each of the second grammatical components into a plurality of third grammatical components according to a third division rule executed by the grammatical processor;

translating each of the third grammatical components into grammatical components of another language;

combining the translated grammatical components into a translated sentence; and displaying the original sentence and the translated sentence in vertical juxtaposition.

6. The automated translation method of claim 5, wherein displaying the original sentence and the translated sentence further comprises:

displaying the original sentence with a first symbol separating each of the first grammatical components;

displaying the translated sentence with the first symbol separating each of the translated grammatical components corresponding to the first grammatical components;

displaying the original sentence with a second symbol separating each of the second grammatical components;

displaying the translated sentence with the second symbol separating each of the translated grammatical components corresponding to the second grammatical components;

displaying the original sentence with a third symbol separating each of the third grammatical components; and displaying the translated sentence with the third symbol separating each of the translated grammatical components corresponding to the third grammatical components.

7. The automated translation method of claim 5, wherein the first, second, and third division rules are each one of:

(a) dividing a sentence or sentence component into a subject component, a verb component, and an object component, (b) dividing a sentence or sentence component into a plurality of clauses, and (c) dividing a sentence or sentence component into a noun phrase and a verb phrase.

8. The automated translation method of claim 5, wherein the first, second, and third division rules are selected from a plurality of division rules by a user.

9. An automated translation method, comprising:

dividing, with a grammatical processor, an original sentence into a plurality of first grammatical components according to a first division rule executed by the grammatical processor;

dividing, with the grammatical processor, each of the first grammatical components having more than a prescribed number of words into a plurality of second grammatical components according to a second division rule executed by the grammatical processors;

translating each of the second grammatical components into grammatical components of another language;

translating each of the first grammatical components, which were not divided into second grammatical components, into grammatical components of another language;

combining the translated grammatical components into a translated sentence; and displaying the original sentence and the translated sentence in vertical juxtaposition.

10. The automated translation method of claim 9, wherein the prescribed number of words is selected by a user at the time of sentence translation.

11. The automated translation method of claim 9, wherein the first and second division rules are selected from a plurality of division rules by a user at the time of sentence translation.

12. An automated translation method, comprising:

(a) dividing, with a grammatical processor, an original sentence into a plurality of first grammatical components according to a first division rule executed by the grammatical processor;

(b) translating each of the first grammatical components into grammatical components of another language;

(c) combining the translated grammatical components corresponding to the first grammatical components into a translated sentence;

(d) displaying the original sentence and the translated sentence in vertical juxtaposition;

(e) determining whether a subsequent division rule is established;

(f) dividing, with the grammatical processor, each of the first grammatical components into a plurality of subsequent grammatical components, or each of a previous plurality of subsequent components into the plurality of subsequent grammatical components, according to the established subsequent division rule that is executed by the grammatical processor;

(g) translating each of the subsequent grammatical components into grammatical components of another language;

(h) combining the translated grammatical components corresponding to the subsequent grammatical components into a subsequently translated sentence;

(i) displaying the original sentence and the subsequently translated sentence in vertical juxtaposition;

(j) determining whether a subsequent division rule is established; and (k) performing steps (f) through (k) again if the subsequent division rule is determined to be established in step (j).

13. The automated translation method of claim 12, wherein the first and each subsequent division rule are selected from a plurality of division rules by a user at the time of sentence translation.

14. The automated translation method of claim 12, wherein displaying the original sentence and the translated or subsequently translated sentence further comprises:

displaying the original sentence with a first symbol separating each of the first grammatical components;

displaying the translated sentence with the first symbol separating each of the translated grammatical components corresponding to the first grammatical components;

displaying the original sentence with a second symbol separating each of the subsequent grammatical components; and displaying the translated sentence with the second symbol separating each of the translated grammatical components corresponding to the subsequent grammatical components.

15. The automated translation method of claim 12, wherein:

the first and subsequent division rules are selected by a user at a time of the translation; and the first and subsequent division rules are each one of:
(a) dividing a sentence or sentence component into a subject component, a verb component, and an object component,
(b) dividing a sentence or sentence component into clauses, and
(c) dividing a sentence or sentence component into a noun phrase and a verb phrase.

16. An automated translator, comprising:

a grammatical processing means for:
(a) dividing an original sentence into a plurality of first grammatical components according to a first division rule, and
(b) dividing each of the first grammatical components into a plurality of second grammatical components according to a second division rule;

a translating means for translating each of the second grammatical components into grammatical components of another language; and a displaying means for combining the translated grammatical components into a translated sentence and displaying the original sentence and the translated sentence in vertical juxtaposition.

17. The automated translator of claim 16, wherein:

the displaying means displays the original sentence with a first symbol separating each of the first grammatical components;

the displaying means displays the translated sentence with the first symbol separating each of the translated grammatical components corresponding to the first grammatical components;

the displaying means displays the original sentence with a second symbol separating each of the second grammatical components; and the displaying means displays the translated sentence with the second symbol separating each of the translated grammatical components corresponding to the second grammatical components.

18. The automated translator of claim 16, wherein the first and second division rules are each one of:
(a) dividing a sentence or sentence component into a subject component, a verb component, and an object component,
(b) dividing a sentence or sentence component into a subject clause and a relative pronoun clause, and
(c) dividing a sentence or sentence component into a noun phrase and a verb phrase.

19. An automated translator, comprising:

a first grammatical processing means for dividing an original sentence into a plurality of first grammatical components according to a first division rule;

a word number counting means for determining which of the first grammatical components have more than a prescribed number of words;

a second grammatical processing means for dividing each of the first grammatical components determined to have more than the prescribed number of words into a plurality of second grammatical components according to a second division rules;

a first translating means for translating each of the first grammatical components, which were not divided into second grammatical components, into grammatical components of another language;

a second translating means for translating each of the second grammatical components into grammatical components of another language; and a display means for combining the translated grammatical components into a translated sentence and displaying the original sentence and the translated sentence in vertical juxtaposition.

20. The automated translator of claim 19, wherein the prescribed number of words is selected by a user at the time of sentence translation.

21. The automated translation method of claim 19, wherein the first and second division rules are selected from a plurality of division rules by a user at the time of sentence translation.

* * * * *